United States Patent [19]
Fallon

[11] Patent Number: 4,514,005
[45] Date of Patent: Apr. 30, 1985

[54] FIBER OPTIC CABLE GRIP
[75] Inventor: David E. Fallon, Pawcatuck, Conn.
[73] Assignee: Harvey Hubbell Incorporated, Orange, Conn.
[21] Appl. No.: 485,322
[22] Filed: Apr. 15, 1983
[51] Int. Cl.³ .......................... F16L 3/00; G02B 7/26
[52] U.S. Cl. ............................... 294/86.42; 24/115 N
[58] Field of Search ............... 294/86 CG; 24/115 R, 24/115 A, 115 H, 115 M, 115 N, 122.3, 122.6, 136 R, 136 L; 248/60; 285/235, 236; 350/96.20, 96.23; 403/220, 223, 291

[56] References Cited
U.S. PATENT DOCUMENTS

| 1,686,250 | 10/1928 | Page | 294/86 CG X |
|---|---|---|---|
| 1,807,993 | 6/1931 | Martin | 294/86 CG |
| 2,740,178 | 4/1956 | Kellems | 294/86 CG |
| 2,766,501 | 10/1956 | Kellems | 294/86 CG X |
| 3,122,806 | 3/1964 | Lewis | 403/220 |
| 3,216,682 | 11/1965 | Lewis | 248/60 |
| 4,319,802 | 3/1982 | Bowes | 350/96.20 |
| 4,368,910 | 1/1983 | Fidrych | 294/86 CG |

FOREIGN PATENT DOCUMENTS 983978 2/1965 United Kingdom .
988510 4/1965 United Kingdom .

Primary Examiner—Johnny D. Cherry
Attorney, Agent, or Firm—Jerry M. Presson; Alfred N. Goodman

[57] ABSTRACT

A grip for pulling fiber optic cable having a wire mesh sleeve for engaging the outer jacket of the cable and a coupling assembly for engaging the strength member in the cable. The grip comprises a hollow member, a pulling eye at the lead end of the hollow member, a wire mesh sleeve at the tail end of the hollow member, and a coupling assembly attached to the hollow member. The hollow member forms a protective sheath supporting the coupling assembly therein. This coupling assembly can be a loop, a bore and a plug assembly or a plurality of set screws.

12 Claims, 12 Drawing Figures

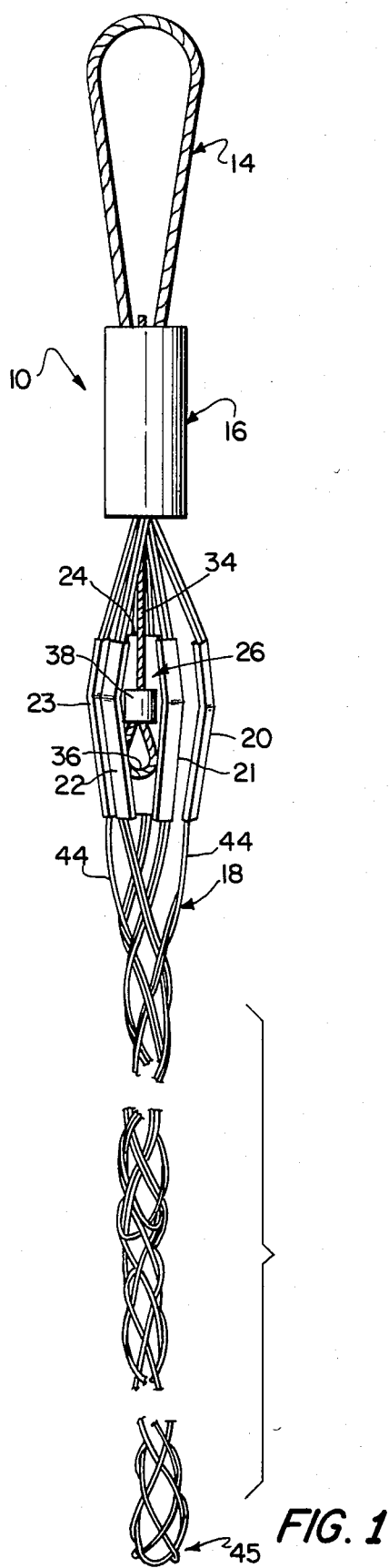
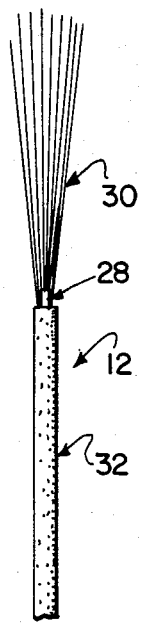
FIG. 3
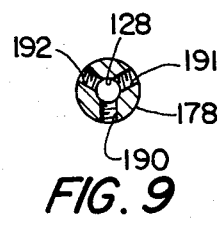
FIG. 9
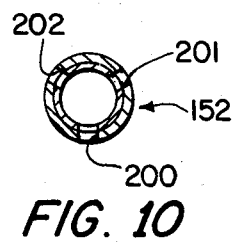
FIG. 10
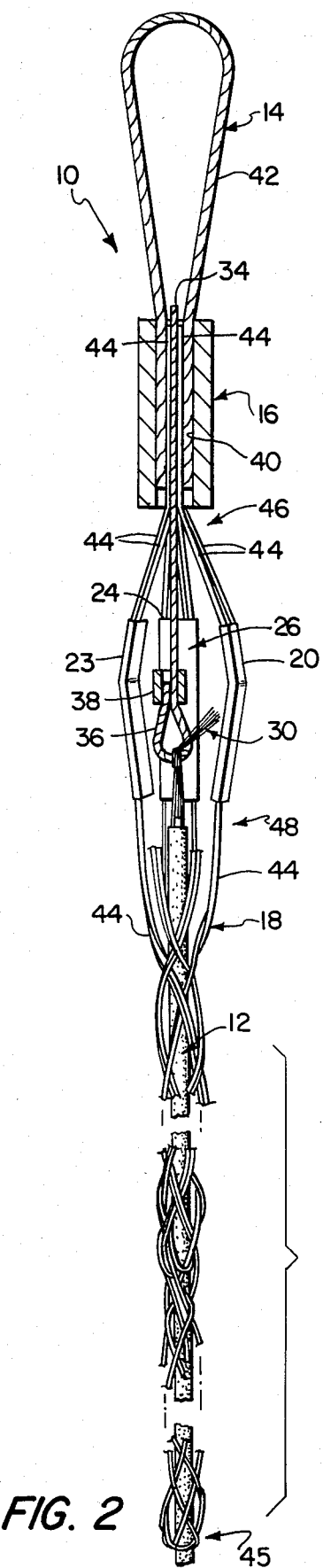

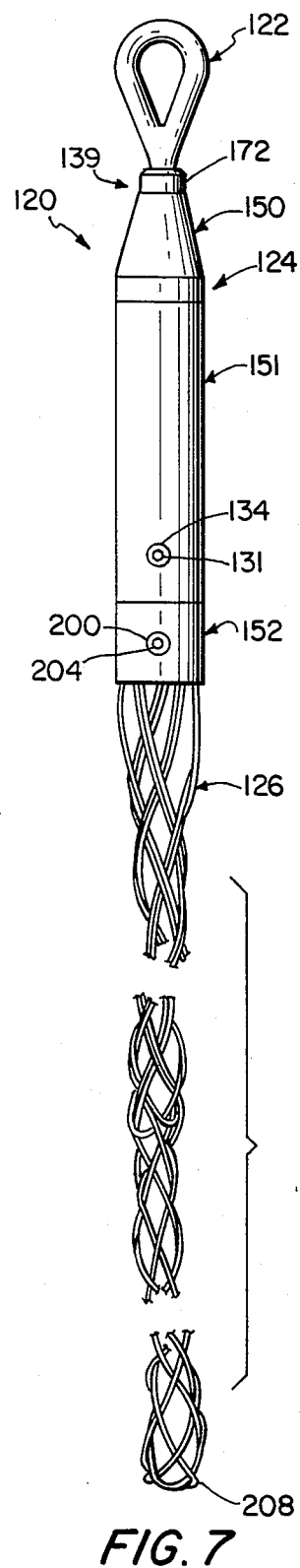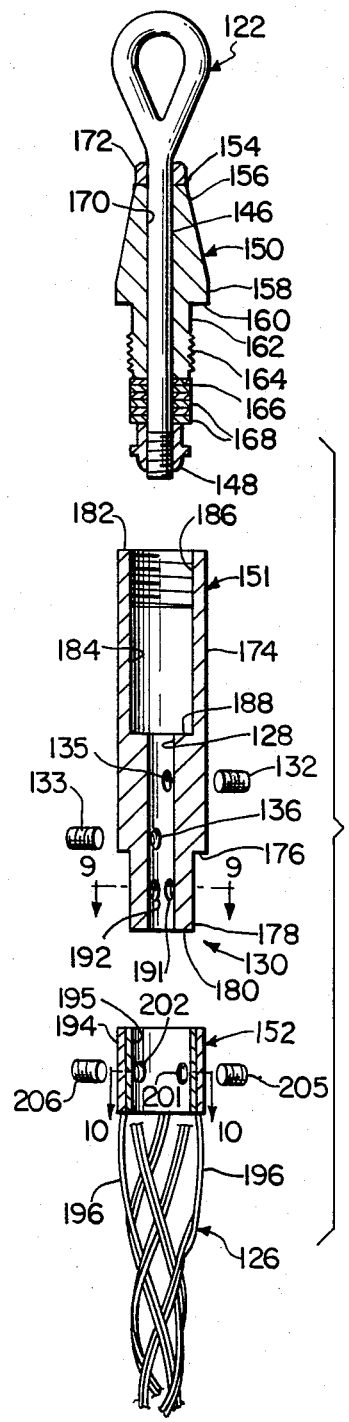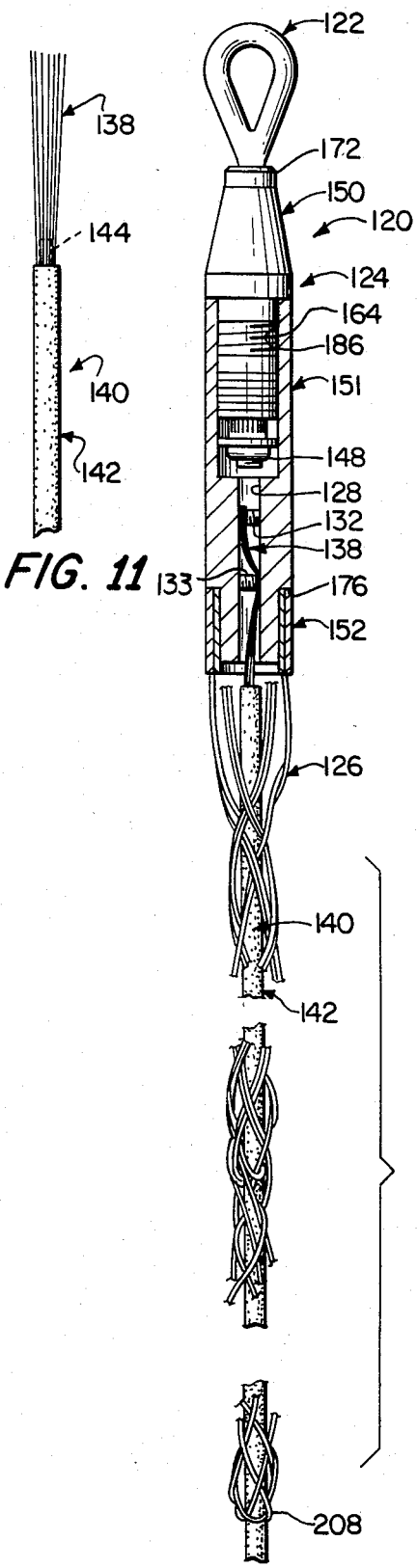
FIG. 7
FIG. 8
FIG. 11
FIG. 12

FIBER OPTIC CABLE GRIP

FIELD OF THE INVENTION

The invention relates to a grip for pulling fiber optic cable. The grip has a wire mesh sleeve for engaging the outer jacket of the cable and a coupling assembly for engaging an exposed end of the strength member in the cable for increased support during pulling.

BACKGROUND OF THE INVENTION

Fiber optic cables usually are constructed in a plurality of concentric layers. Typically, in the center is a single optical fiber or a bundle of such fibers encapsulated by a plastic buffer tube, which is in turn encircled by a plurality of longitudinally extending strength members. These strength members can be formed of plastic or metallic strands. Enclosing the strength members is a plastic outer tubular jacket. To save space and avoid expense, these various layers usually are not adhered to one another.

With the increased use of such fiber optic cables, a great demand presently exists for devices that can safely grip such cable to pull them through conduits or to support the cable in an upright position. While various prior art devices are known for gripping and pulling electrical cable, which use wire mesh sleeves, these prior art devices are not totally acceptable for use with fiber optic cable. Basically, their use alone with such cable is inadequate since gripping the fiber optic cable outer jacket with the wire mesh sleeve tends to extrude the jacket over the inner components of the cable when the cable is under high tension loads. Examples of such conventional wire mesh sleeves utilized with electrical cable are disclosed in U.S. Pat. Nos. 1,686,250 to Page; 1,807,993 to Martin; 2,740,178 to Kellems; 2,766,501 to Kellems; and 3,122,806 to Lewis. An example of a grip utilizing a wire mesh sleeve for specifically gripping fiber optic cable is disclosed in U.S. patent application Ser. No. 213,856, filed on Dec. 8, 1980 in the name of Alfred W. Fidrych and now U.S. Pat. No. 4,368,910 issued on Jan. 18, 1983. While this application does disclose the use of wire mesh grips with fiber optic cable, the only connection between the grip and the cable is the wire mesh sleeve. Thus, there can be a potential extruding of the outer jacket if the cable is under high tension loads. In U.S. patent application Ser. No. 340,900, filed on Jan. 20, 1982 in the name of Alfred W. Fidrych, a gripping device for fiber optic cable is disclosed which attaches the cable to a connector. The gripping device includes a tubular support member, a wire mesh sleeve coupled thereto for gripping the outer surface of the cable and a mechanism for rigidly coupling the longitudinal inner strength member in the cable to the support member.

In all events, there is a continuing need for devices that can safely grip and pull fiber optic cable which do not damage the fragile cable's ability to transmit light or extrude the outer jacket relative to the inner core.

SUMMARY OF THE INVENTION

Accordingly, a primary object of the present invention is to provide a grip for pulling fiber optic cable that does not damage the cable or extrude the outer jacket relative to the inner core.

Another object of the invention is to provide such a grip that has a wire mesh sleeve for engaging the outer jacket of the cable and a coupling assembly for engaging an exposed end of the strength member in the cable to increase the support of the cable during pulling.

Another object of the invention is to provide such a grip that is easy to construct and use.

The foregoing objects are basically attained by providing a grip for pulling fiber optic cable including an optical fiber core, a strength member located adjacent the core and an outer jacket enclosing the strength member with an exposed end of the strength member extending therefrom, the combination comprising a hollow member having a lead end and a tail end; a pulling eye coupled to the hollow member lead end; a wire mesh sleeve coupled to the hollow member at the tail end thereof and adapted to receive the fiber optic cable therein and grip the outer jacket thereof; and a coupling assembly, coupled to the hollow member, for coupling the exposed end of the strength member to the hollow member for increased support during pulling.

As disclosed in FIG. 1–3, the coupling assembly comprises a loop at the end of a cable to which the strength member is tied.

As disclosed in FIGS. 4–6, the coupling assembly comprises a frustoconical bore in the hollow member that receives a resilient plug, with the strength member being clamped therebetween.

As disclosed in FIGS. 7–12, the coupling assembly comprises a plurality of set screws passing through the wall of the hollow member to clamp the strength member in a cylindrical bore in the hollow member. The embodiment shown in FIGS. 7–12 is especially useful when the strength members are formed of metal.

Other objects, advantages and salient features of the invention will become apparent from the following detailed description which, taken in conjunction with the annexed drawings, discloses preferred embodiments of the invention.

DRAWINGS

Referring now to the drawings which form a part of this original disclosure:

FIG. 1 is a side elevational view of a grip in accordance with the invention;

FIG. 2 is a side elevational view in longitudinal section of the grip shown in FIG. 1 with a fiber optic cable engaged by a wire mesh sleeve and the strength member coupled to a hollow member;

FIG. 3 is a side elevational view of a part of a fiber optic cable with an exposed end of the strength member extending therefrom;

FIG. 7 is a side elevational view of a third embodiment of the invention;

FIG. 8 is a side elevational view in longitudinal section and exploded of the grip shown in FIG. 7;

FIG. 9 is a top plan view in section taken along line 9—9 in FIG. 8 showing the three radial threaded bores in the hollow member;

FIG. 10 is a top plan view in section taken along line 10—10 in FIG. 8 showing the three smooth walled radial bores in the lug;

FIG. 11 is a side elevational view of a fiber optic cable in which the strength member is formed of metal strands; and FIG. 12 is a side elevational view in partial section of the grip shown in FIG. 7 with the fiber optic cable engaged by the wire mesh sleeve and the strength member clamped inside the hollow member by means of a plurality of set screws.

DETAILED DESCRIPTION OF THE INVENTION

Figure 4:
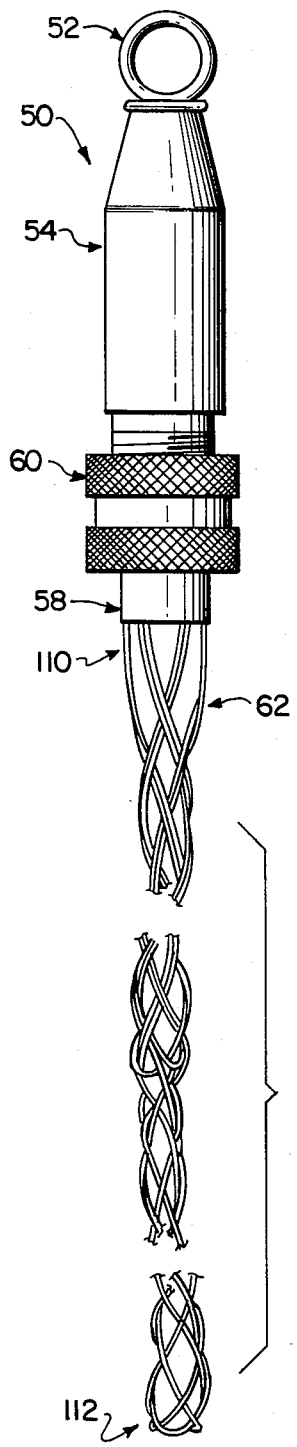
FIG. 4 is a side elevational view of a second embodiment of the invention.

Referring now to FIGS. 1-3, the first embodiment of the invention is shown as grip 10 for engaging and pulling the fiber optic cable 12. The grip 10 comprises a pulling eye 14, a lug 16, a wire mesh sleeve 18, five bent shoulders 20-24 and a coupling assembly 26.

The fiber optic cable 12 comprises an optical fiber core 28, formed as a single fiber or a bundle of fibers, longitudinally extending strands forming a strength member 30 located adjacent and around the core, and an outer jacket 32 enclosing the strength member. As shown in FIG. 3, the strength member 30 is formed from a plurality of strands of plastic material, such as Kevlar, which extend past the end of core 28 and jacket 32 and are exposed.

As shown in FIG. 2, the wire mesh sleeve 18 will engage the outer jacket 32 of the cable and the exposed strength member 30 will be tied to the coupling assembly 26.

The coupling assembly 26 is comprised of a cable 34 having a loop 36 formed at one end by means of a swaged lug 38. The other end of the cable 34 is received in the central bore 40 of lug 16 and is swaged together with the ends of the cable 42 forming the pulling eye 14 and the lead ends of the wires 44 forming the wire mesh sleeve 18.

The wire mesh sleeve 18 is conventional and is constructed so that longitudinal tension forces reduce the diameter of the sleeve into a cable gripping position as shown in FIG. 2, while a longitudinal compression on the sleeve will increase the diameter, allowing the cable to be placed in or removed from the sleeve via open tail end 45.

The five bent shoulders 20-24 are tubular and formed of metal, preferably having rectangular cross sections. These shoulders are bent inwardly at their ends and therefore define a hollow member with the wires 44 on opposite sides thereof, this hollow member having a lead end 46 and a tail end 48. As seen in FIG. 2, the wires 44 are received in the tubular bent shoulders, but the shoulders are transversely compressed so that there is no relative movement therebetween. As seen in FIG. 2, the coupling assembly 26 is located inside the hollow member, which forms a protective sheath around the coupling assembly which withstands transverse compressive forces to protect the connection of the strength member to the loop 36.

By connecting the strength member 30, such as by merely hand tying the exposed strength member to the loop in a knot, increased support during pulling is accomplished since the grip 10, in addition to having the coupling assembly for engaging the strength member, also has the wire mesh sleeve 18 engaging the outer jacket 32 of the cable. To accomplish this, the mesh sleeve is longitudinally compressed and therefore radially expands, the end of the cable 12 is moved into the sleeve via open end 45, the exposed strength member 30 is positioned next to loop 36 and tied thereto, and the sleeve is longitudinally tensioned.

EMBODIMENT OF FIGS. 4-6

Figure 5:
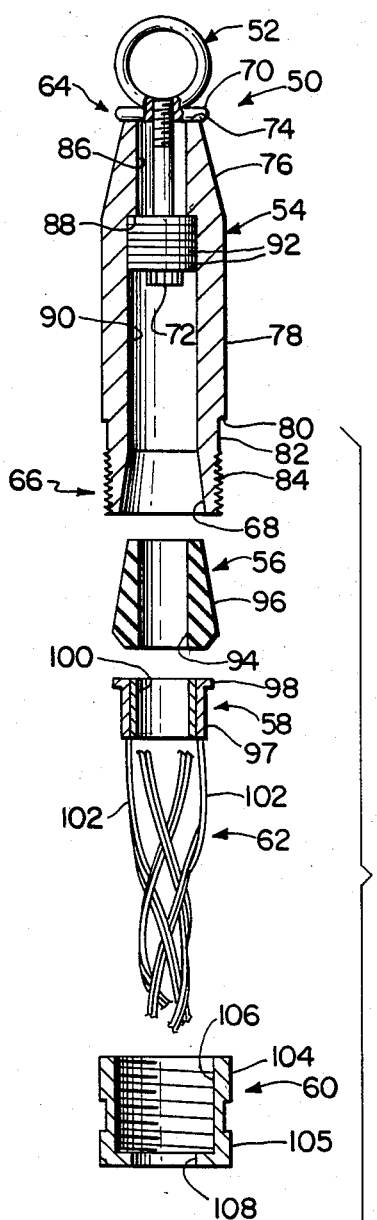
FIG. 5 is a side elevational view in longitudinal section and exploded of the grip shown in FIG. 4.
Figure 6:
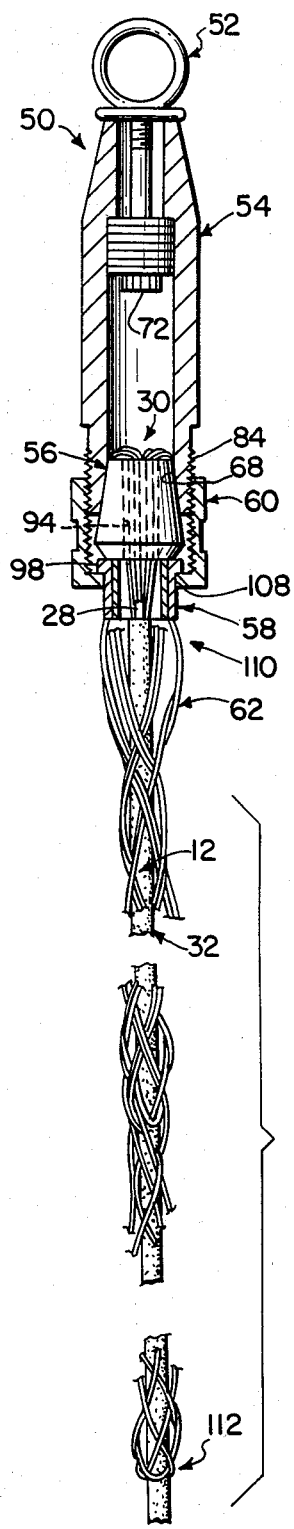
FIG. 6 is a side elevational view in longitudinal section of the grip shown in FIG. 4 with the fiber optic cable engaged by the wire mesh sleeve and the strength member coupled to the hollow member by means of a plug and bore assembly.

The second embodiment of the invention is shown in FIGS. 4-6 wherein the grip 50 comprises a pulling eye 52, a hollow member 54, a plug 56, a lug 58, a retaining cap 60 and a wire mesh sleeve 62. The hollow member 54 has a lead end 64 and a tail end 66, this end having therein an outwardly tapering frustoconical bore 68 which receives plug 56 therein, this combination forming a coupling assembly for strength member 30 on the fiber optic cable 12.

The pulling eye 52 has an internally threaded ring 70 at the bottom which engages the top of the hollow member 54 and is threadedly engaged with a bolt 72 extending into the hollow member.

The hollow member 54 is preferably rigid and formed of metal having on its outer surface an upper annular shoulder 74, an outwardly tapering frustoconical portion 76 extending from shoulder 74, a cylindrical portion 78 extending from the frustoconical portion 76, a downwardly facing annular shoulder 80 extending inwardly from the cylindrical portion 78 and a cylindrical portion 82 extending downwardly from shoulder 80 and having threads 84 thereon. On the inside extending downwardly from shoulder 74 is a cylindrical portion 86, a downwardly facing annular shoulder 88, a cylindrical portion 90 and frustoconical bore 68.

As seen in FIGS. 5 and 6, a plurality of bearing rings 92 are received in cylindrical portion 90 between the head of the bolt 72 and shoulder 88 so that pulling eye 52 can rotate relative to the hollow member 54 during the pulling operation.

Plug 56 is formed of resilient, preferably elastomeric, material and has a central cylindrical bore 94 and an inwardly tapering frustoconical surface 96 having substantially the same angle of taper as bore 68, surface 96 being longer longitudinally than bore 68.

Lug 58 is comprised of an outer cylindrical tube 97 having an external flange 98 and an internal cylindrical tube 100, these tubes being swaged with wires 102 forming the wire mesh sleeve 62 therebetween to rigidly couple the wire mesh sleeve to the lug.

The retaining cap 60 is basically cylindrical with knurled annular sections 104 and 105 on the outer surface and threads 106 on the inner surface and with a radially inwardly extending flange 108 at the bottom, this flange 108 having an inner diameter slightly larger than the outer diameter of tube 97 but smaller than the outer diameter of flange 98 on lug 58.

The wire mesh sleeve 62 has its lead end 110 coupled to lug 58 as described above and has its open tail end 112 shown at the bottom of FIGS. 4 and 6.

In use, the fiber optic cable 12 with an exposed end of strength memer 30 extending therefrom is maneuvered through the tail end 112 of the wire mesh sleeve 62 with the sleeve, lug 58 and plug 56 being separated from the hollow 54 as seen in FIG. 5. The strength member 30 is passed through lug 58 and plug 56 and the strength member strands are draped radially outwardly over the outer frustoconical surface 96 of the plug. Then the plug is pushed into frustoconical bore 68, thereby clamping the strands of the strength member 30, as seen in FIG. 6, against the surface of bore 68. Lug 58 is then pushed into engagement with the end of the plug and the retaining cap 60 is threadedly engaged via its internal threads 106 with the external threads 84 on the hollow member 54. When fully threaded, flange 108 on cap 60 engages flange 98 on lug 58, this lug being in engagement with the plug. Sleeve 62 is then longitudinally tensioned to grip the cable.

Thus, the strength member 30 is clamped to the hollow member 54 and in addition the wire mesh sleeve 62 engages the outer jacket 32 of the fiber optic cable 12. By such a connection, the fragile end of the fiber optic cable is protected via the protective sheath formed from the hollow member 54, plug 56 and lug 58 depending upon how far the end of the cable is placed therein. In all events, the combination of the plug 56 and the frusto-conical bore 68 form a coupling assembly for coupling the strength member to the hollow member for increased support during pulling.

EMBODIMENT OF FIGS. 7-12

Referring to FIGS. 7-12, a third embodiment of the invention is shown including a grip 120 comprising a pulling eye 122, a hollow member 124, and a wire mesh sleeve 126. As seen in FIG. 8, the hollow member 124 has a cylindrical bore 128 opening at the tail end 130 thereof and three set screws 131-133 which pass through threaded bores 134-136 in the wall of the hollow member to form a coupling assembly to engage the strength member 138, seen in FIG. 11, on a fiber optic cable 140 having an outer jacket 142 and an inner optical fiber core 144.

In this embodiment, advantageously the strength member 138 is formed from a plurality of metallic strands which work well with the set screws in the coupling assembly.

The pulling eye 122 is located at the lead end 139 of the hollow member and has a shaft 146 extending downwardly therefrom with a threaded end carrying an internally threaded nut 148.

The hollow member 124 is formed from first, second and third members 150-152. The first member 150 has an annular upwardly facing shoulder 154 at the top and extending downwardly on the outer surface a frusto-conical portion 156, a cylindrical portion 158, a downwardly facing annular shoulder 160, and a cylindrical portion 162 with external threads 164. The bottom of the first member 150 has a downwardly facing annular shoulder 166. Received on the shaft 146 between shoulder 166 and nut 148 are a plurality of bearing rings 168. As seen in FIG. 8, a cylindrical bore 170 is formed inside the first member extending centrally from shoulders 154 to 166, shaft 146 being received in this bore. A nylon bushing 172 is located around the shaft and rests on shoulder 154.

The second member 151 is basically a cylindrical body having on the outer surface a cylindrical portion 174, a downwardly facing annular shoulder 176, a cylindrical portion 178 and a downwardly facing annular shoulder 180 at the bottom thereof. On the inside of the second member 151 leading from the upper annular shoulder 182 at the top is a cylindrical bore 184 having threads 186 at the top and an upwardly facing annular shoulder 188 at the bottom. Cylindrical bore 128 referred to above extends from shoulder 188 to shoulder 180.

As best seen in FIGS. 7 and 8, the three threaded bores 134-136 are spaced 120° apart, extend in the radial direction and pass completely through the wall of the second member 151 between the internal cylindrical bore 128 and the outer cylindrical surface 174. These threaded bores are longitudinally spaced along the second member between external shoulder 176 and internal shoulder 188.

As seen in FIGS. 8 and 9, three additional threaded bores 190-192 are formed in the wall of the second member 151 between the internal cylindrical bore 128 and the outer cylindrical surface 178, these bores being spaced 120° and extending radially. As seen in FIG. 9, these three threaded bores 190-192 are in the same plane.

The third member 152 is formed from an outer cylindrical tube 194 swaged with an inner cylindrical tube 195 with wires 196 from the wire mesh sleeve 126 being located and rigidly coupled therebetween. As seen in FIGS. 8 and 10, a third set of bores 200-202 with smooth walls are formed radially through the third member 152 for the reception of a second set of set screws 204-206, which are threadedly engaged in threaded bores 190-192 in the second member 151.

In use, the first member 150 is threadedly engaged via threads 164 with the second member 151 and the fiber optic cable 140 is moved through wire mesh sleeve 126 via the open tail end 208. The exposed end of the strength member 138 is maneuvered through the third member 152 into the cylindrical bore 128, as seen in FIG. 12, at which time the three set screws 131-133 are tightened so as to clamp the strength member 138 against the inner cylindrical bore 128 in the second member 151.

Then, the third member 152 is moved upwardly around cylindrical portion 178 until it engages shoulder 176. Next, the second set of set screws 204-206 are passed through the smooth bores 200-202 in the third member 152 and are threadedly engaged with threaded bores 190-192 in the second member 151, thereby rigidly connecting the second and third members together. The wire mesh sleeve 126 is then longitudinally tensioned so as to engage the outer jacket of the fiber optic cable 140 and the pulling operation can commence.

While various advantageous embodiments have been chosen to illustrate the invention, it will be understood by those skilled in the art that various changes and modifications can be made therein without departing from the scope of the invention as defined in the appended claims.

What is claimed is:

1. A grip for pulling fiber optic cable including an optical fiber core, a strength member located adjacent the core and an outer jacket enclosing the strength member with an exposed end of the strength member extending therefrom, the combination comprising:

a hollow member having a lead end and a tail end and an inner surface;

a pulling eye coupled to said hollow member lead and;

a wire mesh sleeve coupled to said hollow member at said tail end thereof and adapted to receive the fiber optic cable therein and grip the outer jacket thereof; and coupling means, coupled to said hollow member, for coupling the exposed end of the strength member to said hollow member for increased support during pulling, said coupling means comprising means for releasably clamping the strength member directly against said inner surface and under an outwardly directed clamping force.

2. A grip according to claim 1, wherein said means for releasably clamping comprises
   a bore located adjacent said hollow member tail end,
   a plug receivable in said bore, and
   means for retaining said plug in said bore.
3. A grip according to claim 2, wherein
   said bore is frustoconical, and
   said plug has a frustoconical portion receivable in said bore.
4. A grip according to claim 2, wherein
   said plug is formed of resilient material.
5. A grip according to claim 2, wherein
   said means for retaining comprises a threaded portion on said hollow member and a cap having internal threads threadedly engageable with said threaded portion.
6. A grip according to claim 2, wherein
   said means for retaining also couples said wire mesh sleeve to said hollow member.
7. A grip according to claim 1, wherein said means for releasably clamping comprises
   at least one threaded bore formed in and passing through said hollow member, and
   at least one set screw threadedly received in said threaded bore for engaging the exposed end of the strength member.
8. A grip according to claim 1, wherein
   said hollow member comprises a body having a cylindrical bore.
9. A grip according to claim 8, wherein
   said cylindrical bore is open at said tail end for receiving the exposed end of the strength member therein.
10. A grip according to claim 1, wherein
    said wire mesh sleeve is coupled to said hollow member by a plurality of set screws.
11. A grip for pulling fiber optic cable including an optical fiber core, a strength member located adjacent the core and an outer jacket enclosing the strength member with an exposed end of the strength member extending therefrom, the combination comprising:
    a hollow member having a lead end and a tail end and an inner surface.
    a pulling eye coupled to said hollow member lead end;
    a wire mesh sleeve coupled to said hollow member at said tail end thereof and adapted to receive the fiber optic cable therein and grip the outer jacket thereof; and
    coupling means, coupled to said hollow member, for coupling the exposed end of the strength member to said hollow member for increased support during pulling,
    said coupling means being located inside said hollow member, and
    said coupling means comprising
       means for releasably clamping the strength member directly against said inner surface and under an outwardly directed clamping force.
12. A grip according to claim 11, wherein
    said hollow member is formed of rigid material.

* * * * *